United States Patent [19]

Hess et al.

[11] Patent Number: 4,698,667
[45] Date of Patent: Oct. 6, 1987

[54] METHOD TO REESTABLISH A PREDETERMINED PHASE RELATIONSHIP OF A CHROMINANCE TV SIGNAL WITH RESPECT TO A REFERENCE

[75] Inventors: Heinz Hess, Weiterstadt; Horst Peth, Alsbach-Hähnlein, both of Fed. Rep. of Germany

[73] Assignee: Robert Bosch GmbH, Stuttgart, Fed. Rep. of Germany

[21] Appl. No.: 859,642

[22] Filed: May 5, 1986

[30] Foreign Application Priority Data

May 17, 1985 [DE] Fed. Rep. of Germany ....... 3517697

[51] Int. Cl.$^4$ ............................................. H04N 9/64
[52] U.S. Cl. ........................................ 358/35; 358/37
[58] Field of Search .......................... 358/21 R, 35, 37

[56] References Cited

U.S. PATENT DOCUMENTS 4,285,006  8/1981  Kurahashi ............................ 358/35
4,434,438  2/1984  Rzeszewski ......................... 358/35
4,502,076  2/1985  Cluniat ................................. 358/35

FOREIGN PATENT DOCUMENTS 100954  2/1977  Japan ................................... 358/35

OTHER PUBLICATIONS

Article by H. Fix, in "RTM" Television Slow-Motion Apparatus for Black-White and Color TV by Use of a Magnetic Disc Memory, No. 6, 1968, pp. 249-259.

Primary Examiner—Michael A. Masinick
Attorney, Agent, or Firm—Frishauf, Holtz, Goodman & Woodward

[57] ABSTRACT

To simplify the apparatus and the method steps to reestablish predetermined phase relationship of a chrominance TV signal with a reference, two chrominance derived signals of carrier frequency, respectively phase shifted by plus and minus 45° with respect to the carrier frequency are obtained; chrominance derived signals, likewise phase shifted with respect to the input chrominance signal, are amplitude modulated with set voltages, and the amplitude modulated chrominance derived signals are so added that the phase position of the resulting chrominance signal will match that of the reference carrier.

8 Claims, 4 Drawing Figures

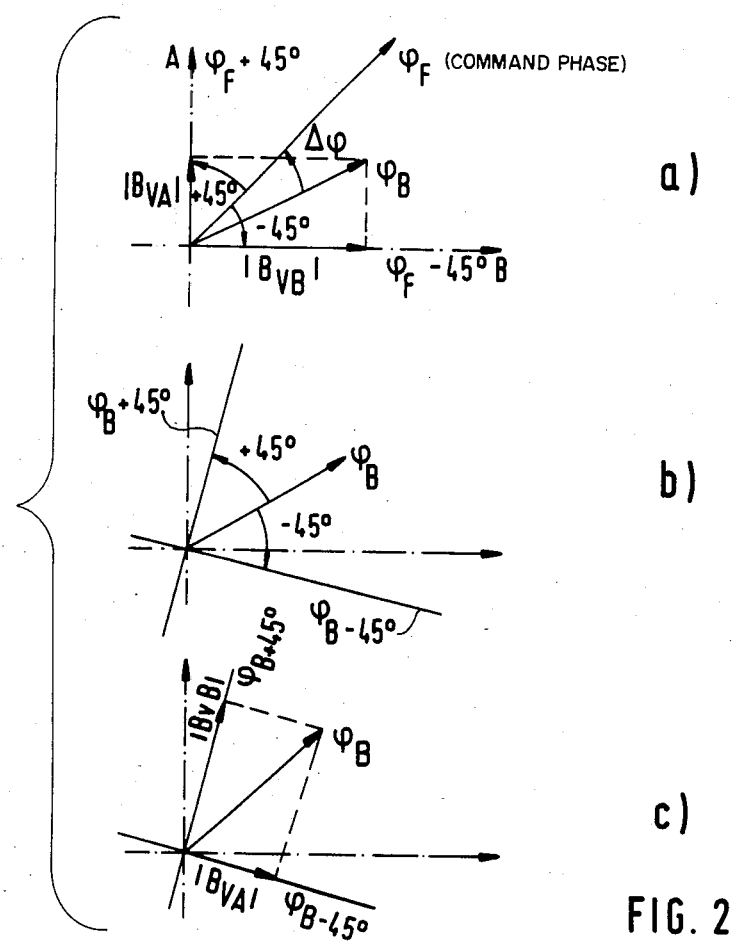
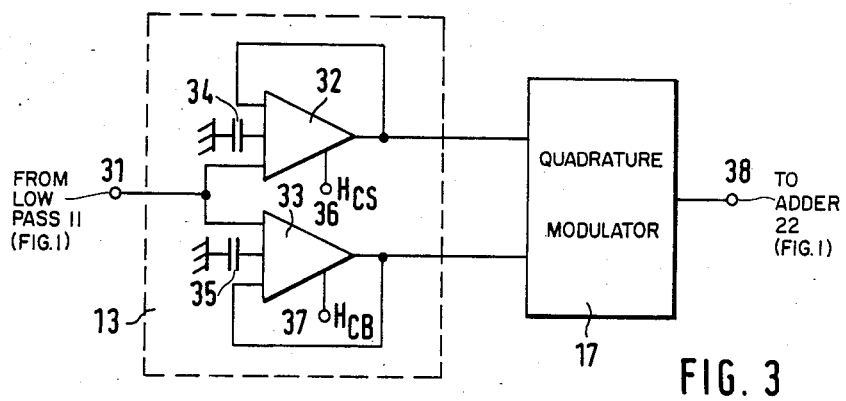
FIG. 3

METHOD TO REESTABLISH A PREDETERMINED PHASE RELATIONSHIP OF A CHROMINANCE TV SIGNAL WITH RESPECT TO A REFERENCE

Reference to related publications:

German patent Disclosure Document No. DE-OS 22 40 816, Mesak (claiming priority of U.S. application Ser. No. 172,982, of Aug. 19, 1971);

Article by H. Fix et al, in "RTM", No. 6, 1968, pages 249–259 "Television Slow-Motion Apparatus for Black-White and Color TV by Use of a Magnetic Disc Memory".

The present invention relates to the processing of color television signals, and moree particularly to reestablish a predetermined phase relationship of a chrominance signal with respect to a carrier reference signal.

BACKGROUND

A precise phase relationship between a chrominance signal with respect to a predetermined reference carrier signal is required under various conditions. For example, a video signal, derived from a magnetic tape apparatus, may have to be synchronized, in phase, with a local reference, for example a clock pulse in studio apparatus in order to permit mixing and phasing-over of recorded signals with signals derived in the studio. Time base errors may occur due to inaccuracies in the running of the magnetic tape in the magnetic tape apparatus. These time base errors result in phase errors in the chrominance signal, which, when reproduced, become apparent as undesirable changes in color saturation and hue. Reproduction of a video signal from magnetic tape under slow-motion conditions, or as a stopped image, also requires reintroduction of corrected chroma carrier phase signals with respect to a studio chroma carrier signal of studio phase. Other signals may require phase synchronization, and rather than signals derived from magnetic tape apparatus, external signals which are received, for example, over beamed paths, from satellites, or the like, may be conducted into a studio for processing therein.

It has previously been proposed—see, for example, the referenced German Patent Disclosure Document No. DE-OS 22 40 816 (claiming priority U.S. Ser. No. 172,982, of Aug. 19, 1971), Mesak, to correct chroma carrier phase errors by controlled delay lines. This permits synchronization of any asynchronously coded video signal, transmitted by, for example, the NTSC or PAL system, with a predetermined reference. The apparatus required is complex and needs many components due to the extensive memory capacity which is needed, in order to store video images. The synchronization of the audio signal is lost.

The referenced published article by H. Fix in the publication "RTM", No. 6, 1968, pp. 249–259, describes a system in which two set voltages are derived corresponding to phase deviation of the chroma signal from a reference carrier signal; the so-derived set voltages are stored for the duration of a line scan (see particularly pages 257, 258 of the cited literature). The chroma synchronizing signal is separated from the chrominance signal and applied to a phase demodulator which has two synchronous demodulators. The output derived from the phase demodulator will be pulses of the demodulated chroma synchronization signals, the amplitudes of which will be a measure of the phase difference between the reference signal and the chrominance signal derived, for example, from a recording apparatus. This is the chrominance signal which may have an incorrect or erroneous phase position. The voltage values of the pulses are stored in a memory for the duration of a line scan. The resulting step voltages are transformed back by two synchronous modulators in a chrominance carrier oscillation. The signal then will have the same phase as the chrominance synchronization signal derived from the apparatus, the oscillation, however, being available during the entire line scan.

The apparatus required is complex, since two demodulation processes are necessary for the chroma difference signals. These signals, on the one hand, are demodulated by means of the studio reference signal and, on the other, by means of the chroma carrier from the input signal—which, as above described, may have the erroneous chroma carrier phase position. An additional difference formation of the two demodulation products is necessary, so that, to generate a correction signal, an additional modulation of the reference signal with the signal components of video frequency must be carried out.

THE INVENTION

It is an object to provide a method which solves the problem of reestablishment of phase position of the chroma signal with respect to a reference, which is simple and requires only few and well known and readily available circuit components.

Briefly, two chroma derived signals of carrier frequency are obtained, respectively phase shifted by 90° with respect to each other, with reference to the chroma carrier frequency; the chroma-derived signals are amplitude-modulated with the respective set voltages, and the amplitude modulated chroma derived signals are added in a manner to thereby match the phase position of the chroma signal to that of the reference carrier.

The method has the advantage that only one demodulation step must be carrier out; conversely, only one modulation step is necessary, and, then, a phase matched chrominance signal is directly obtained.

In accordance with a preferred embodiment, the two set voltages are stored in a sample-and-hold (S+H) circuit for one line scan duration; the S+H circuits may include two respective subcircuits, one each scanning the black level value and the chroma synchronizing signal during any one line scan; this arrangement provides for particularly good stabilization.

DRAWINGS

FIG. 2 is a representation of three vector diagrams, drawn to the same scale, and the same time axis, illustrating the signals arising in the system of FIG. 1;

FIG. 3 is a fragmentary diagram of a circuit to generate the set voltages; and

DETAILED DESCRIPTION

Figure 1:
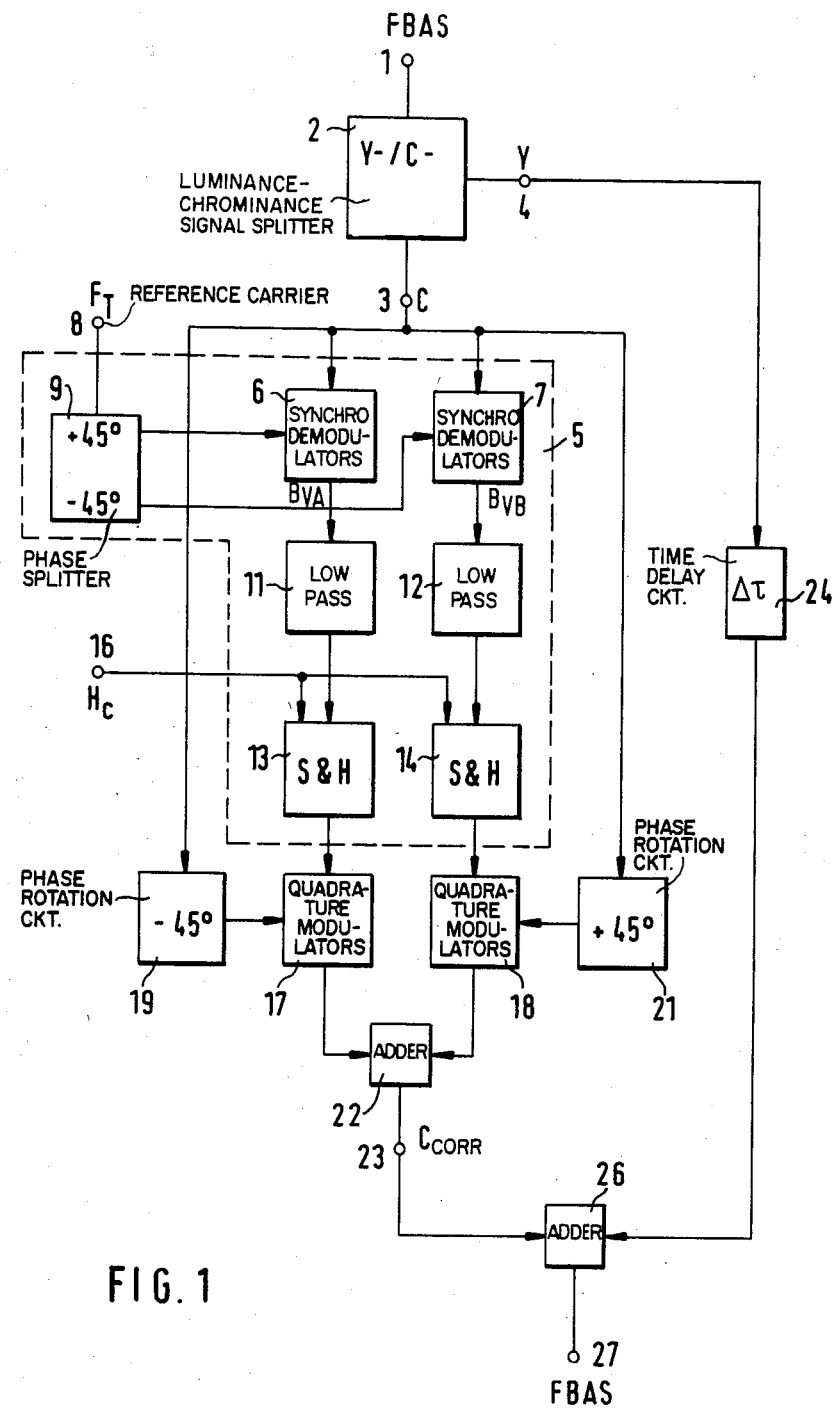
FIG. 1 is a basic block diagram of a system carrying out the present invention, in which the respective circuit components having specific functions are shown separately.

FIG. 1 is a detailed basic block circuit diagram of a system to correct the chrominance signal. A terminal 1 has a composite video signal FBAS, with, for example, an erroneous or incorrect phase position of the chrominance component thereof applied thereto. A luminance-chrominance splitter or separating stage 2 receives the signal from terminal 1, to split the signal into a luminance (Y) and chrominance (C) component. A splitter may, for example, utilize a high-pass/low-pass filter. The chrominance signal C is available on terminal 3; the luminance signal Y is available on terminal 4. If the signal on terminal 1 is a PAL-type signal, the chrominance synchronizing-switch-over or phase change must be eliminated prior to correction.

The chrominance input signal C which, for example, carries a time base error or, respectively, a phase error, is applied to a circuit 5 to generate a set voltage. The set voltage circuit 5 includes a quadrature demodulation circuit arrangement, formed by two synchro demodulators 6, 7 which demoduate the reference carrier $F_T$, applied to a terminal 8, after the reference carrier has been split into two phases of, respectively, ±45° in a phase splitter 9. The output voltages from the synchro demodulators 6, 7, $B_{VA}$ and $B_{VB}$, respectively, are representative of the instantaneous phase deviation of the chroma signal C, which may have a phase error therein, with respect to the reference signal applied as the reference carrier to terminal 8.

Referring now to the phase diagram, FIG. 2, and specifically graph (a) thereof, which shows the respective vectors $B_{VA}$ as well as $B_{VB}$ in dependence on an errorcontaining chroma synchronizing signal, vector $\phi_B$ which is generated by demodulation with the reference signal, vector $\phi_F$. Graph (a) also shows the correction angle $\Delta\phi_{CORR}$ which has to be applied to the vector $\phi_B$ to bring the signal in phase with the command phase $\phi_F$, formed in the reference signal.

Referring again to FIG. 1: The two output voltages $B_{VA}$ and $B_{VB}$ are connected over respective low-pass filters 11, 12, for suppression of high-frequency interference signals, to respective sample-and-hold (S+H) circuits 13, 14. The S+H circuits 13, 14 additionally receive a scanning or sampling pulse at the terminal 16. This scanning pulse may be derived, for example, from the horizontal synchronizing signal. The S+H circuits 13, 14 are so arranged that the voltage values representative of the respective phase deviations are scanned during that time and are held or stored during the subsequent duration of a line. The set voltages, derived from the outputs of the unit 5, are then applied to two quadrature modulators 17, 18 to control the quadrature modulators. The quadrature modulators additionally receive the chrominance input signal C, subject to the phase or timing error, over respective phase rotation circuits 19, 21.

FIG. 2, graph (b), and drawn in alignment with graph (a), shows the effect and operation of the phase rotation circuits 19, 21. Circuit 19 which, for example, is an integrating element, rotates the input signal by −45°. Circuits 21 which, for example, is a differentiator, rotates the input signal by +45°. The chroma synchronizing signal having the phase $\phi_B$ is, thus, split into the component signals with the new coordinate $\phi_B-45°$ and $\phi_B+45°$.

The two signals are now amplitude modulated or amplitude weighted at the output of the unit 5, which is illustrated by the vector diagram c of FIG. 2. The signal $\phi_B-45°$ is weighted or modulated by the set voltage $B_{VA}$, and the signal $\phi_B+45°$ with the set voltage $B_{VB}$, so that a phase rotation $\Delta\phi_{CORR}$ to the desired command phase $\phi_F$—see graph (a)—will result.

The phase shifted signals, that is, signals phase shifted by 90° with respect to each other, are then added in adder 22, so that the output 23 will provide the corrected chrominance signal. This corrected chrominance signal is added in a further adder 26 to a luminance signal Y. The luminance signal Y is suitably time-delayed in time delay circuit 24, to reestablish the proper phase and time relationship with the chrominance signal, which has passed through the unit 5. The output 27 from the adder 26 then provides an error-free composite video signal FBAS.

A particularly suitable, and hence preferred form, of the S+H circuit is shown in FIG. 3. The circuit of FIG. 3 utilizes as an example the circuit 13, although, of course, the circuit 14 may be identical thereto.

Figure 4:
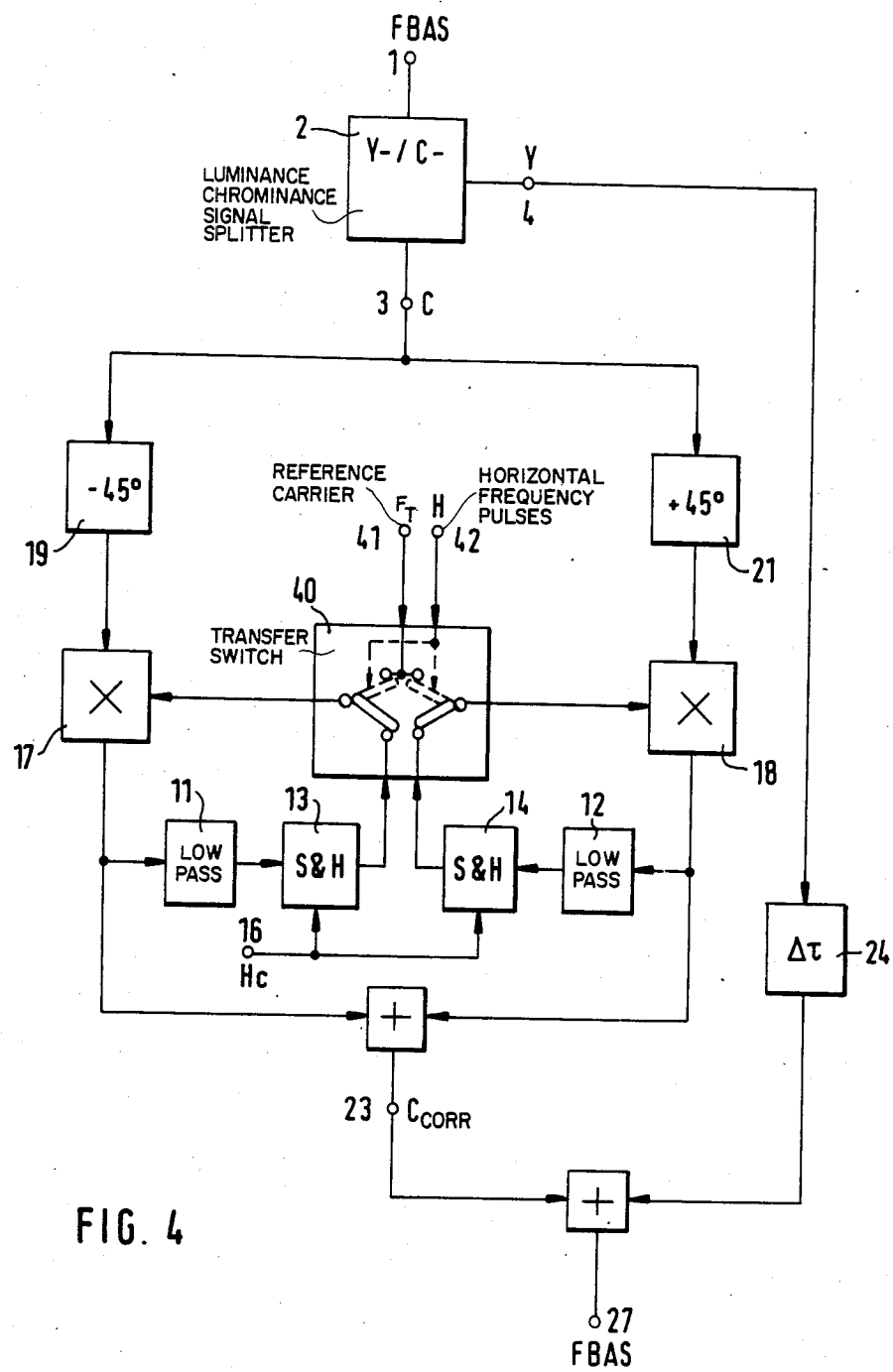
FIG. 4 is a block circuit diagram of another embodiment to obtain a corrected chrominance signal.

The input 31 receives the signal from the low-pass filter 11 (FIG. 1), which is the demodulated, filtered chroma difference signal. It is applied, in parallel, to inputs of two separate S+H circuit elements 32, 33. Each separate S+H element 32, 33 is coupled to a capacitor 34, 35, respectively, which has another terminal connected to a reference voltage level, for example ground, as shown. The circuits 32, 33 receive scanning pulses over respective sampling inputs 36, 37. The scanning pulses applied are: to terminal 36, a pulse $H_{CS}$ during the black or black-level value; and a pulse $H_{CB}$, applied to terminal 37, during the duration of the chroma synchronizing signal. Thus, the input signal is scanned or sampled at two different times and stored in the capacitors 34, 35, respectively. The two scanning values are then applied to the subsequent quadrature modulator 17, in which the values are subtracted from each other, that is, the difference of the two values is formed. This arrangement, in simple and effective manner, eliminates voltage drift, for example occurring due to temperature changes. The signal at the output 38, as above described, is then applied to one input of the adder 22, FIG. 1. The circuit arrangement described in connection with FIG. 1 shows various functional blocks in separate form, which also provide for ease of explanation of the method. The circuit of FIG. 1 can be simplified in that functions thereof can be combined. Those circuit components which are identical or similar to FIG. 1 have been given the same reference numerals. In the circuit of FIG. 4, the function of the circuit elements 6 and 17, and 7 and 18, respectively, are combined. This permits elimination of the circuit components 6, 7 and the stage 9 of the unit 5, generating the set voltage.

The set voltages for the two quadrature modulators 17, 18, in accordance with the embodiment of FIG. 4, are derived from output signals and switched by means of a transfer switch 40 to apply the respective set voltages during the time occurrence of the chroma synchronization signal to the respective modulators 17, 18 during the active line scan duration. The reference signal $F_T$, applied to terminal 41, is connected to one terminal of a transfer switch 40 and applied to the modulators 17, 18 during the chroma synchronization signal duration; at that time, the switches are in the broken-line position. During the active line scan, the set voltages are applied by the transfer switch 40 to the modulators 17, 18, as shown by the position of the switches in full-line position. The transfer switch 40 is controlled by horizontal frequency pulses applied to terminal 42.

Various changes and modifications may be made within the scope of the inventive concept. The phase splitter 9 may use phase rotation circuits similar to circuits 19, 21.

We claim:

1. In the art of television signal processing,
a method to reestablish the phase relationship of an input chrominance signal with respect to a carrier reference signal,
in which two set voltages are derived, corresponding to the phase deviation of the input chrominance signal from the reference carrier signal and said so-derived voltages are stored for the duration of a line scan,
comprising, in accordance with the invention, the steps of
deriving two chrominance derived signals of the carrier frequency, respectively phase shifted by 90° with respect to each other, with reference to the chrominance carrier frequency;
amplitude modulating said chrominance derived signals with the respective set values; and
adding the amplitude modulated chrominance derived signals to thereby match the phase position of the resulting chrominance signal to that of the reference carrier.

2. Method according to claim 1, wherein one carrier frequency chrominance signal is phase shifted by +45°, and a second carrier frequency chrominance signal is phase-shifted by −45°, both phase shifts being carried out with respect to the chrominance input signal;
and wherein one of the phase shifted chrominance carrier frequency signals is amplitude modulated by a set voltage representative of the sine of the phase angle of the input chrominance signal with respect to the carrier reference, and another phase shifted carrier frequency chrominance derived signal is amplitude modulated with a set value representative of the cosine of the phase angle of the input chrominance signal with respect to the carrier reference signal.

3. Method according to claim 1, wherein the step of deriving the set voltages comprises scanning and holding the modulated chrominance signal during the black level or blanking duration of the demodulated chrominance signal and further scanning and holding the demodulated chrominance signal during the chroma synchronization period;
forming the difference of the scanned and held values;
and the step of amplitude modulating is carried out with the so-derived difference value.

4. Method according to claim 1, wherein the set voltages ($B_{VA}$, $B_{VB}$) are derived by the step of synchronously demodulating the input chrominance signal by the chrominance derived phase shifted signals, which are phase shifted, with respect to the carrier frequency signal by, respectively, plus and minus 45°.

5. Method according to claim 1, wherein the set voltages ($B_{VA}$, $B_{VB}$) are derived by phase shifting the input chrominance signal, respectively, by plus and minus 45°, to obtain two derived input chrominance signal components;
and modulating the respectively phase shifted input chrominance signal components with the respectively phase shifted chrominance derived signals of carrier frequency.

6. Method according to claim 1, wherein the step of phase shifting a signal by plus 45° is carried out by passing said signal through a differentiating element (21), and the step of phase shifting said signal by minus 45° is carried out by passing said signal through an integrating circuit (19).

7. Method according to claim 6, wherein said signal is the input chrominance signal.

8. Method according to claim 6, wherein said signal is the carrier reference signal.

* * * * *